(12) United States Patent
Petrick

(10) Patent No.: US 6,991,351 B1
(45) Date of Patent: Jan. 31, 2006

(54) ILLUMINATION SYSTEM

(75) Inventor: John T. Petrick, New Port Richey, FL (US)

(73) Assignee: TWR Lighting, Inc., Houston, TX (US)

( * ) Notice: Subject to any disclaimer, the term of this patent is extended or adjusted under 35 U.S.C. 154(b) by 0 days.

(21) Appl. No.: 10/736,292

(22) Filed: Dec. 15, 2003

(51) Int. Cl.
*B60Q 1/06* (2006.01)
*F21V 29/00* (2006.01)

(52) U.S. Cl. ............ 362/373; 362/191; 362/249; 362/268; 362/374; 362/375; 340/815.45; 340/953

(58) Field of Classification Search ........ 362/190–191, 362/249, 363–365, 555, 268, 373–375; 340/815.45, 340/953
See application file for complete search history.

(56) References Cited

U.S. PATENT DOCUMENTS

| | | | | |
|---|---|---|---|---|
| 4,085,433 A | * | 4/1978 | Baranowski | 361/744 |
| 5,237,490 A | * | 8/1993 | Ferng | 362/183 |
| 5,567,036 A | * | 10/1996 | Theobald et al. | 362/485 |
| 5,585,783 A | * | 12/1996 | Hall | 340/473 |
| 5,688,042 A | * | 11/1997 | Madadi et al. | 362/240 |
| 5,806,965 A | * | 9/1998 | Deese | 362/249 |
| 5,890,794 A | * | 4/1999 | Abtahi et al. | 362/294 |
| 6,099,148 A | * | 8/2000 | Northrup et al. | 362/336 |
| 6,104,611 A | * | 8/2000 | Glover et al. | 361/700 |
| 6,158,882 A | * | 12/2000 | Bischoff, Jr. | 362/488 |
| 6,425,678 B1 | * | 7/2002 | Verdes et al. | 362/244 |
| 6,483,439 B1 | * | 11/2002 | Vukosic | 340/815.65 |
| 6,507,290 B1 | * | 1/2003 | Lodhie et al. | 340/981 |
| 6,626,557 B1 | * | 9/2003 | Taylor | 362/249 |

* cited by examiner

*Primary Examiner*—Stephen Husar
*Assistant Examiner*—Jason Han
(74) *Attorney, Agent, or Firm*—Edward P. Dutkiewicz

(57) ABSTRACT

An illumination system has a mounting plate, a plurality of thermally conductive circuit boards in thermal contact with the mounting plate, a plurality of light emitting diodes electrically and thermally communicating with the circuit board strips, an optical lens formed as a translucent dome covering the circuit boards and light emitting diodes, and a lamp base operatively coupled to the mounting plate and circuit boards. The light emitting diodes receive power from an external electrical source entering the system through the base and the circuit boards.

1 Claim, 8 Drawing Sheets

ILLUMINATION SYSTEM

BACKGROUND OF THE INVENTION

1. Field of the Invention

The present invention relates to an illumination system and more particularly pertains to providing efficient and highly recognizable devices for producing light.

2. Description of the Prior Art

The use of illumination systems of known designs and configurations is known in the prior art. More specifically, illumination systems of known designs and configurations previously devised and utilized for the purpose of providing recognizable devices for producing light are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,425,678 issued Jul. 30, 2002 to Verdes.

While the prior art devices fulfill their respective, particular objectives and requirements, they do not describe illumination system that provides efficient and highly recognizable devices for producing light.

In this respect, the illumination system according to the present invention substantially departs from the conventional concepts and designs of the prior art, and in doing so provides an apparatus primarily developed for the purpose of providing efficient and highly recognizable devices for producing light.

Therefore, it can be appreciated that there exists a continuing need for a new and improved illumination system which can be used for providing efficient and highly recognizable devices for producing light. In this regard, the present invention substantially fulfills this need.

SUMMARY OF THE INVENTION

In view of the foregoing disadvantages inherent in the known types of illumination systems of known designs and configurations now present in the prior art, the present invention provides an improved illumination system. As such, the general purpose of the present invention, which will be described subsequently in greater detail, is to provide a new and improved illumination system and method which has all the advantages of the prior art and none of the disadvantages.

To attain this, the present invention essentially comprises a thin circular plate comprised of thermally conductive material. The circular plate has an upper surface and a lower surface with a plurality of radially paired apertures extending there through and located equally spaced there around. The circular plate has an external diameter of a first diameter size.

Next provided are a plurality of rectilinear "L" shaped thermally conductive circuit boards. Each circuit board has an internal face, an external face, a pair of parallel side edges. Each circuit board also has a long vertical portion and a short horizontal portion and a bend between the long vertical portion and the short vertical portion. A pair of apertures is provided through the short horizontal portion. The circuit boards are arranged in a circular configuration with adjacent parallel side edges being located adjacent each other and all the internal faces forming a hexagonal circular configuration and coupled to the plate such that the pair of apertures of the plate are aligned with the paired apertures of the short horizontal portion of the circuit boards.

A plurality of light emitting diodes function as light emitters. The diodes are coupled to the long vertical portion of the circuit board with thermally conductive paste adapted to maximize heat transfer. The diodes are electrically coupled to a circuit provided thereon.

Next, an optical lens of a generally cylindrical configuration formed as a translucent dome is enclosed. The lens has a closed top end and an open bottom end having an internal step having an internal diameter having a second diameter size, the second diameter being larger than the first diameter. The optical lens is comprised of a transparent material. The lens has a beam pattern as required for the specific application. The open bottom end is configured to receive and hold the circular plate. The open bottom end of the lens has a lip having a third external diameter, the third diameter being larger than the second diameter.

A mounting base is next provided. The mounting base is of a generally cylindrical configuration with an open top part, a closed bottom part and a side face there around. The top part has a lip adapted to lie adjacent the lower surface of the plate and within the lens. The lip has an external diameter having the size of a first diameter, so that the lip is received within the second internal diameter of the lens. The lip of the base also has a third external diameter sized to match and mate with the external third diameter of the lens. The base has a socket aperture and flange extending from the mounting base. The base has a wire aperture there through to allow the passage of wires.

A plurality of rivets are provided. The rivets couple the circuit boards and the plate together.

A gasket is provided to be positioned between the lower lip and the upper lens. The gasket provides a weather-proof seal against the elements.

Lastly, a retainer ring is provided. The retainer ring has a third internal diameter and is configured to couple together the lens and the plate and the mounting base.

The light emitting diodes are adapted to receive power from an external electrical source configured to enter the system through the wiring aperture of the mounting base through the circuit board to the light emitting diode. The electrical source may be either alternating current or direct current, preferably direct current. The system is configured to work within current ranges of between about 300 mille-Amperes and 5 Amperes. The diodes are arranged in pairs, with each pair being wired in parallel so that with the failure of one diode of a pair, the current can be readily handled by the other diode of the pair. A plurality of pairs of diodes, or working sets, are arranged in series.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved illumination system which has all of the advantages of the prior art illumination systems of known designs and configurations and none of the disadvantages.

It is another object of the present invention to provide a new and improved illumination system which may be easily and efficiently manufactured and marketed.

It is further object of the present invention to provide a new and improved illumination system which is of durable and reliable constructions.

An even further object of the present invention is to provide a new and improved illumination system which is susceptible of a low cost of manufacture with regard to both materials and labor, and which accordingly is then susceptible of low prices of sale to the consuming public, thereby making such illumination system economically available.

Even still another object of the present invention is to provide an illumination system for providing efficient and highly recognizable devices for producing light.

Lastly, it is an object of the present invention to provide a new and improved illumination system with a mounting plate, a plurality of thermally conductive circuit boards in thermal contact with the mounting plate, a plurality of light emitting diodes electrically and thermally communicating with the circuit board strips, an optical lens formed as a translucent dome covering the circuit boards and light emitting diodes, and a lamp base operatively coupled to the mounting plate and circuit boards. The light emitting diodes receive power from an external electrical source entering the system through the base and the circuit boards. Circuitry can give the status of the system at any given time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
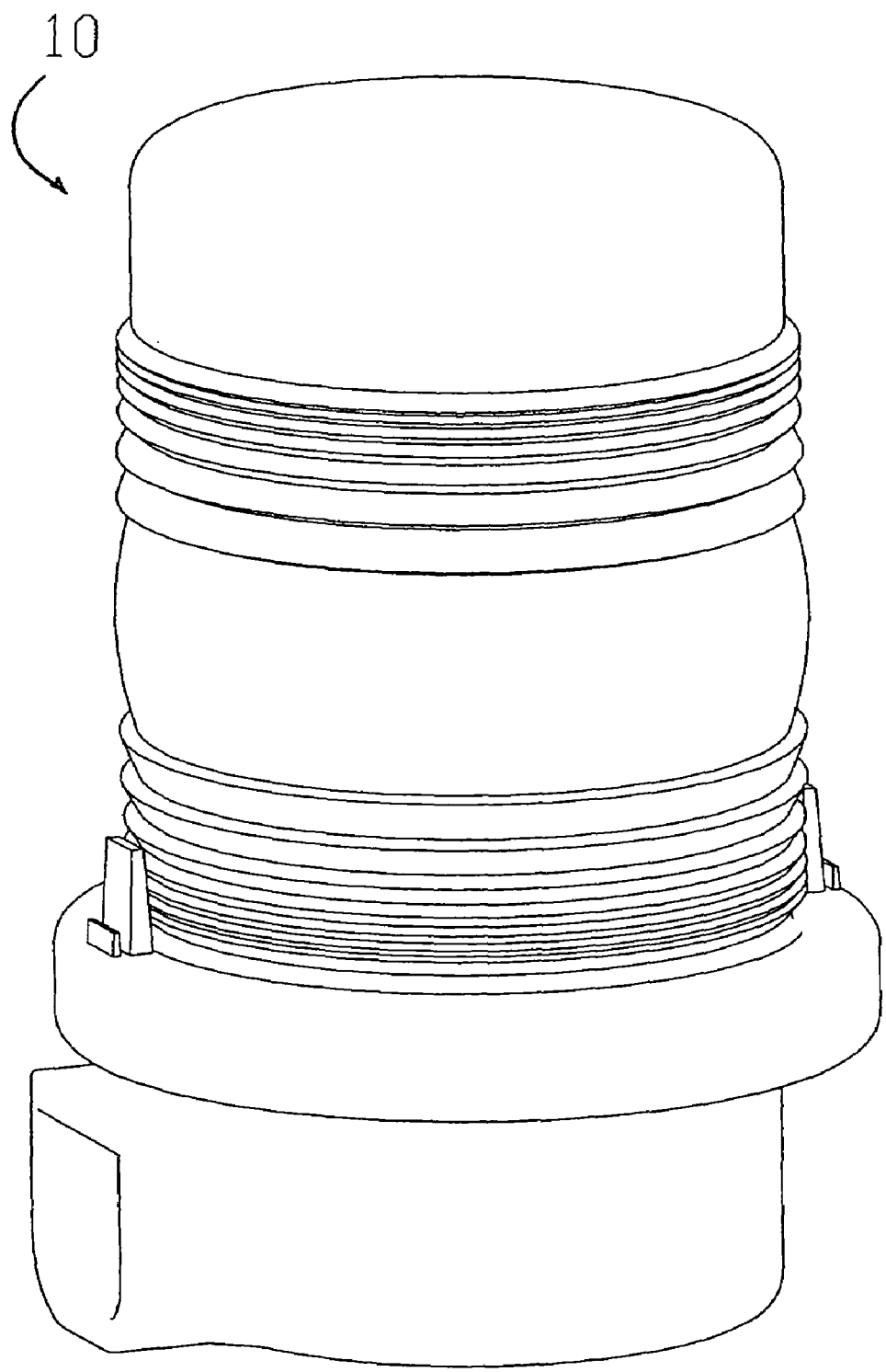
FIG. 1 is a perspective illustration of an LED obstruction lighting system constructed in accordance with the principles of the present invention.
Figure 2:
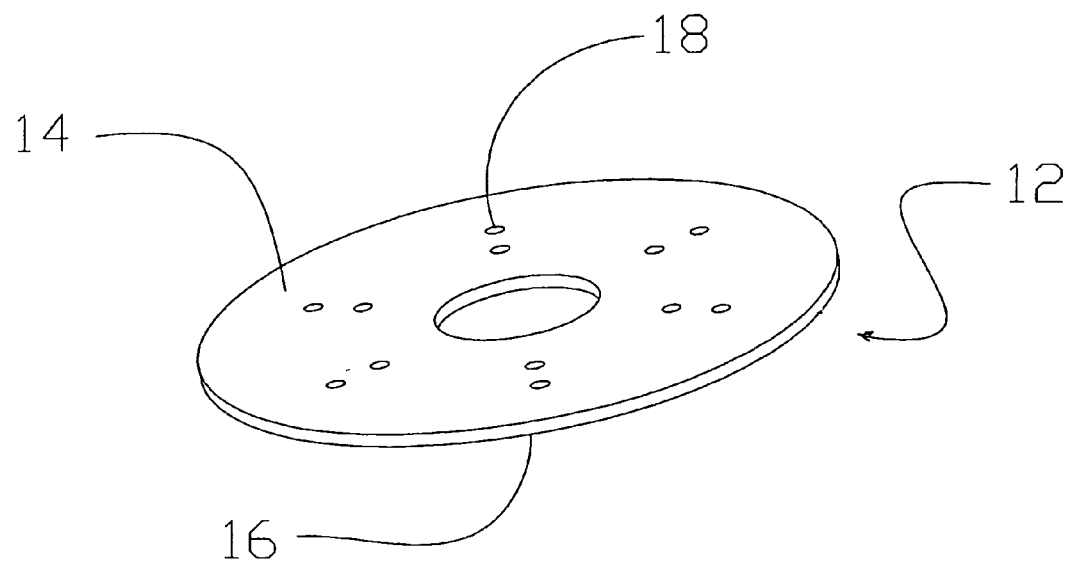
FIG. 2 is a perspective illustration of the circular plate demonstrating the relationship of the paired apertures.
Figure 2A:
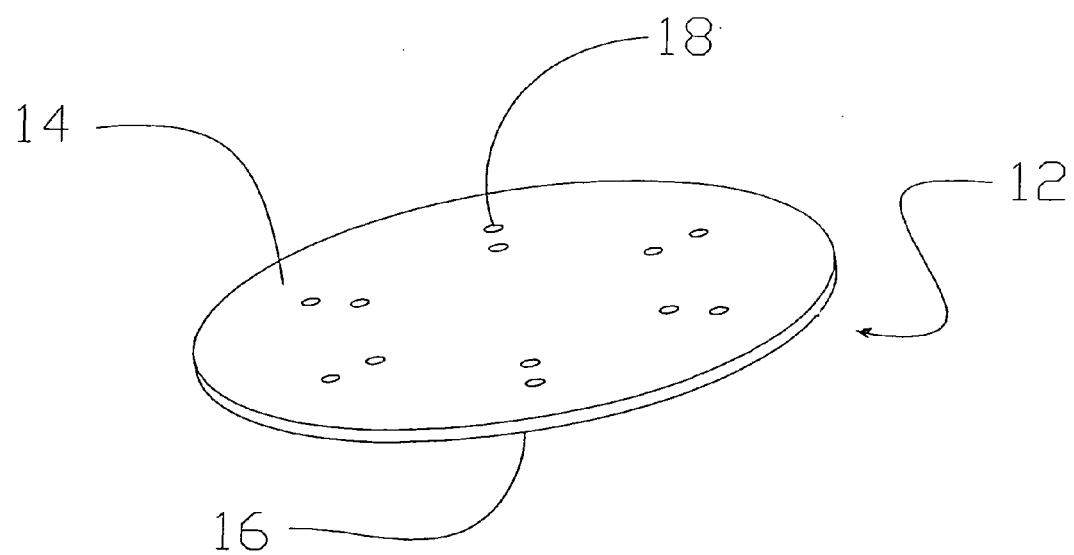
FIG. 2A is a perspective illustration of the circular plate not having a central aperture.
Figure 3:
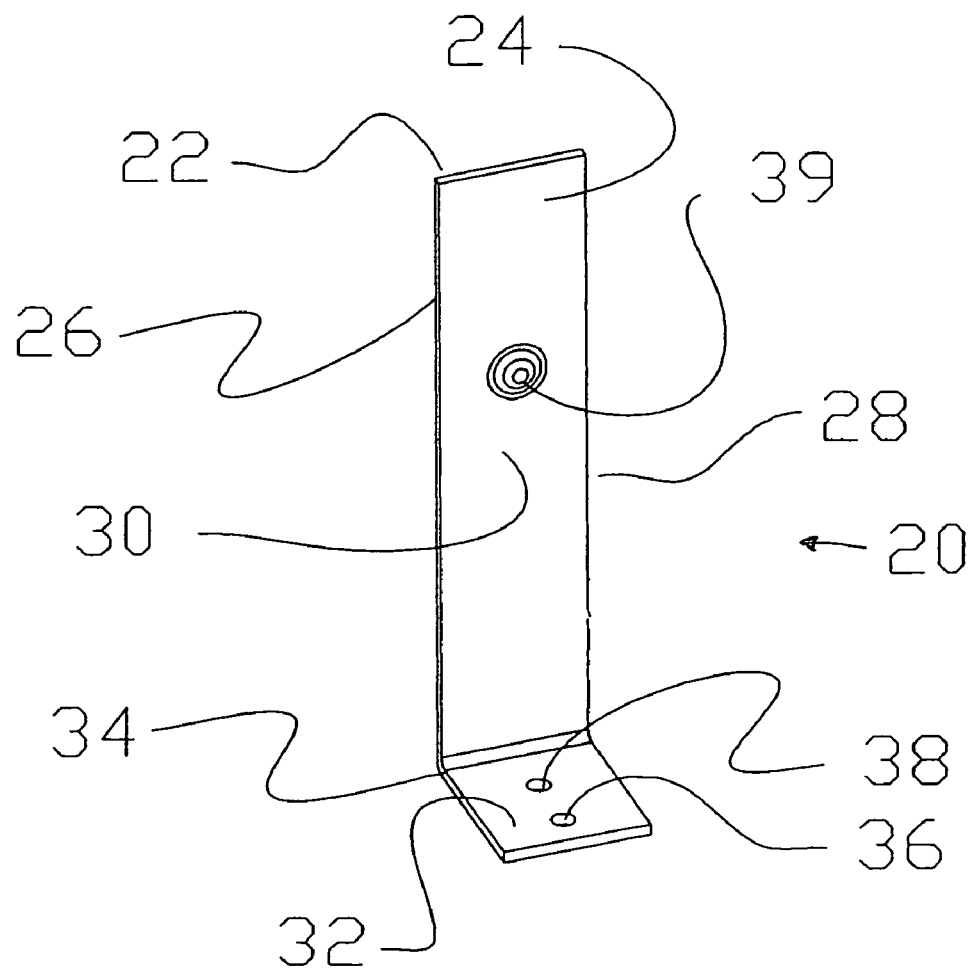
FIG. 3 is a perspective illustration of one of the circuit boards with a light emitting diode coupled thereto.
Figure 4:
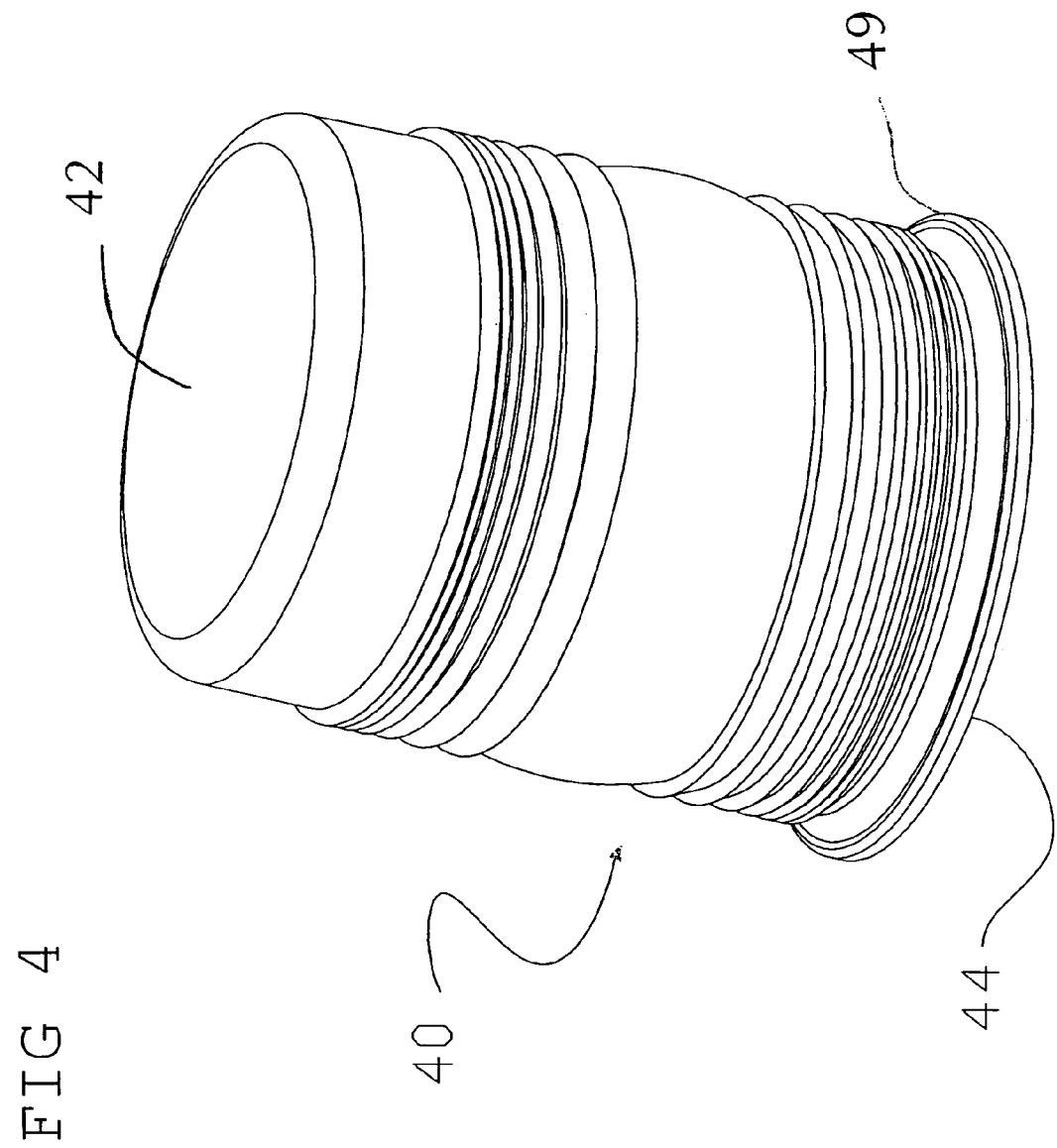
FIG. 4 is a perspective illustration of the system shown in FIG. 2 but with the base removed.
Figure 5:
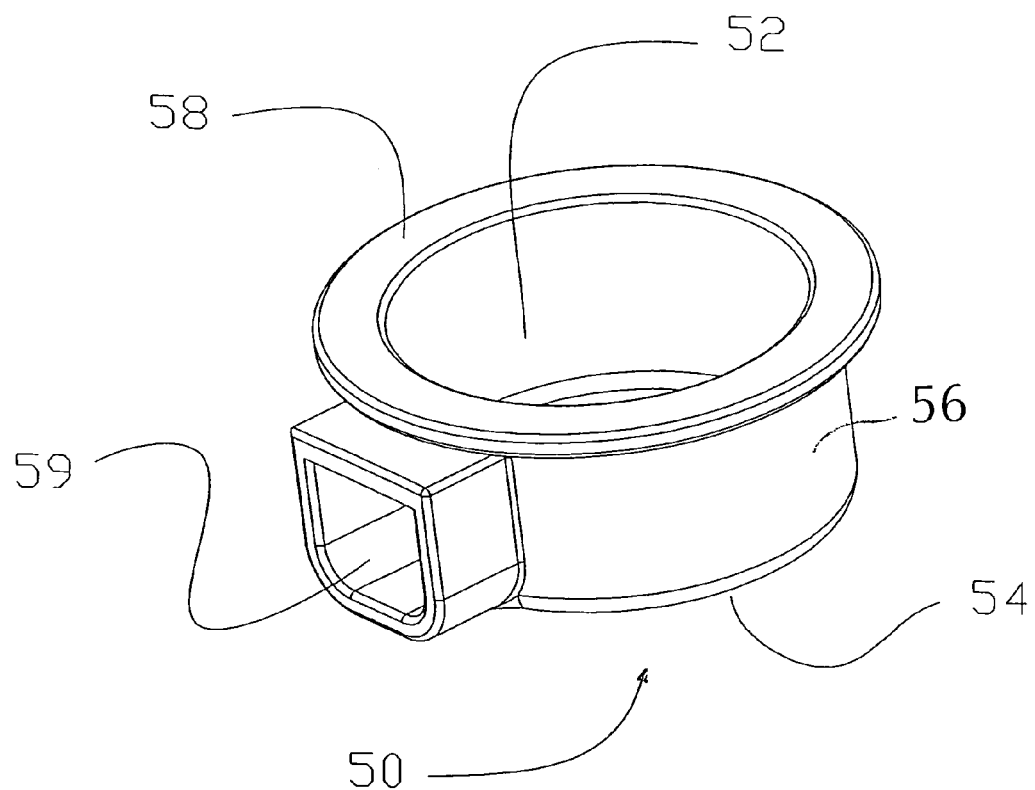
FIG. 5 is a perspective illustration of an alternate embodiment of the base.
Figure 6:
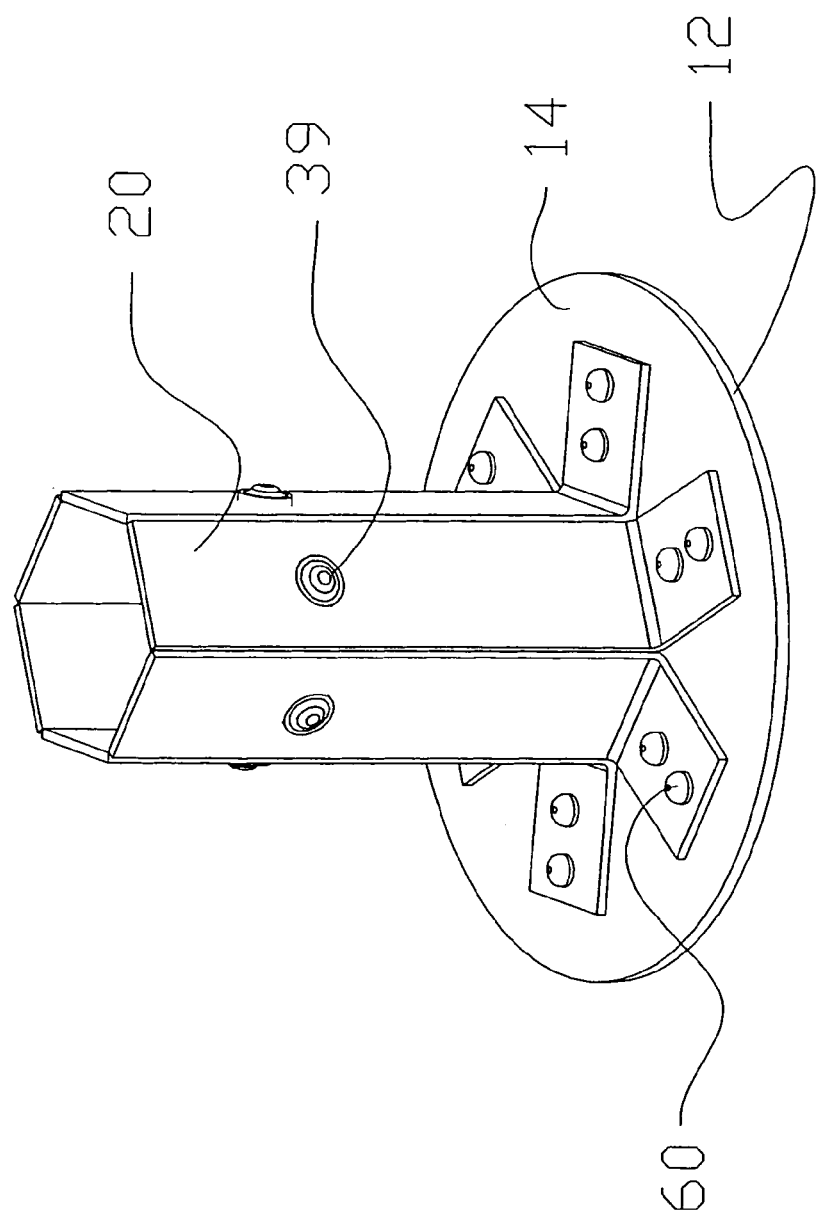
FIG. 6 is a perspective of the circular plate with the "L" shaped thermally conductive circuit boards, with Led's, coupled thereto.
Figure 7:
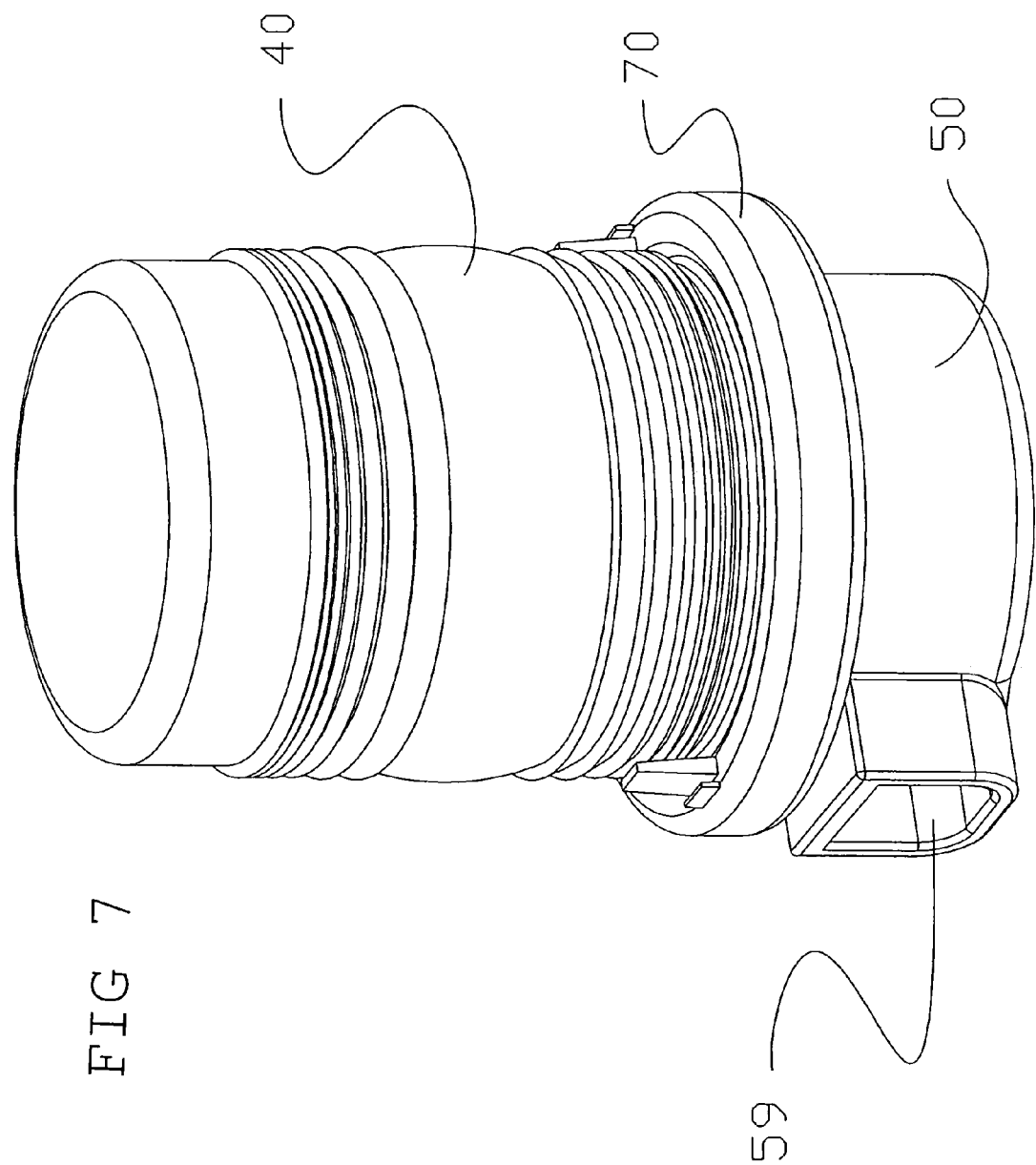
FIG. 7 is a side perspective of an alternate embodiment of the Illumination System.
Figure 8:
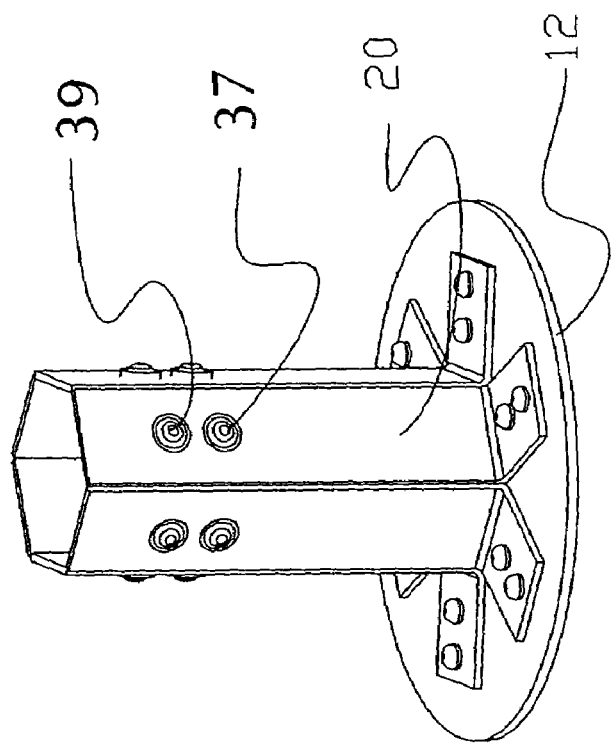

With reference now to the drawings, and in particular to FIG. 1 thereof, the preferred embodiment of the new and improved illumination system embodying the principles and concepts of the present invention and generally designated by the reference numeral 10 will be described.

The present invention, the illumination system 10 is comprised of a plurality of components. Such components in their broadest context include a circular mounting plate, a plurality of thermally conductive circuit boards, a plurality of light emitting diodes, an optical lens formed and a lamp base. Such components are individually configured and correlated with respect to each other so as to attain the desired objective.

The present invention essentially comprises a thin circular plate 12 comprised of thermally conductive material. The circular plate has an upper surface 14 and a lower surface 16 with a plurality of radially paired apertures 18 extending there through and located equally spaced there around. The circular plate has an external diameter of a first diameter size. The circular plate may have a central aperture, or the plate may be configured without having a central aperture.

Next provided are a plurality of rectilinear "L" shaped thermally conductive circuit boards 20. Each circuit board has an internal face 22, an external face 24, a pair of parallel side edges 26, 28. Each circuit board also has a long vertical portion 30 and a short horizontal portion 32 and a bend 34 between the long vertical portion and the short vertical portion. A pair of apertures 36, 38 is provided through the short horizontal portion.

The circuit boards are arranged in a circular configuration with adjacent parallel side edges being located adjacent each other and all the internal faces forming a symmetrical configuration and coupled to the plate such that the pair of apertures of the plate are aligned with the paired apertures of the short horizontal portion of the circuit boards.

A plurality of light emitting diodes 37, 39 function as light emitters. The diodes are coupled to the external face of the long vertical portion of the circuit board with thermally conductive paste adapted to maximize heat transfer. The diodes are electrically coupled to a circuit provided thereon. A single diode may be coupled to a circuit board, or more than one diode may be coupled to the circuit board, depending on the desired result.

Next, an optical lens 40 of a generally cylindrical configuration formed as a translucent, clear or colored dome is enclosed. The lens has a closed top end 42 and an open bottom end 44 having an internal step having an internal diameter having a second diameter size, the second diameter being larger than the first diameter. The optical lens is comprised of a transparent material. The lens has a Fresnel-type beam pattern as required for specific applications. The open bottom end is configured to receive and hold the circular plate. The open bottom end of the lens has a lip 49 having a third external diameter, the third diameter being larger than the second diameter.

A mounting base 50 is next provided. The mounting base is of a generally cylindrical configuration with an open top part 52, a closed bottom part 54 and a side face 56 there around. The top part has a lip 58 adapted to lie adjacent the lower surface of the plate and within the lens. The lip has an external diameter having the size of a first diameter, so that the lip is received within the second internal diameter of the lens. The lip of the base also has a third external diameter sized to match and mate with the external third diameter of the lens.

The base has a entrance aperture 59 to allow the passage of wires, and a flange extending from the mounting base.

A plurality of rivets 60 are provided. The rivets couple the circuit boards and the plate together.

Lastly a retainer ring 70 is provided. The retainer ring has a third internal diameter and is configured to couple together the lens and the plate and the mounting base.

In an alternate embodiment, the system may be coupled together by a means other than a retainer ring. The lens and base may be threadedly coupled, or may be coupled by a snap means.

The light emitting diodes are adapted to receive power from an external electrical source configured to enter the system through the entrance aperture of the mounting base through the circuit board to the light emitting diode. The electrical source may be either alternating current or direct current, preferably direct current. The system is configured to work within current ranges of between about 300 mille-Amperes and 5 Amperes.

The diodes are arranged in pairs, with each pair being wired in parallel so that with the failure of one diode of a pair, the current can be readily handled by the other diode of the pair. A plurality of pairs of diodes, or working sets, are arranged in series.

In a working model, Luxeon brand red emitters operating at 350 Mille-Amperes with an acrylic Fresnel dome lens meet or exceed the requirements for obstruction lights when the emitters are affixed to four or more boards and positioned in a horizontal circular arrangement having a minimal diameter.

The parallel combination of LED's are driven using a constant current power source as typically used in powering LEDs. The current applied is set to the operating current of a single LED. Powering LEDs from this source results in current sharing between LEDs and approximately half of the current will be applied to each LED. Operation at half current will result in a greatly increased LED lifetime. Additionally, should one LED fail (open circuit) on a given circuit board, the remaining LED will be powered at full current and the lumenaire will continue to operate at full optional output, thereby increasing lifetime. Note that the vertical separation of LEDs should be minimal as the peak optical output of the lumenaire will shift position upward or downward depending on which LED fails. Tests have shown that the vertical displacement does not invalidate use of this invention in aircraft obstruction and taxiway lighting.

Emitter are affixed to thermal conductive circuit boards in a manner that facilitates heat conduction from emitter to board. This mode of heat transfer forms the novelty of this invention since prior art uses a more costly, less efficient, cylindrical heat sink to remove heat from the emitters. In practice, the emitter has a large scale surface mount component that is soldered to electrically conductive traces on the board. Thermal contact is ensured by the use of thermally conductive paste which is applied between the emitter and the board. In addition, the solder tabs of each emitter removes heat from the emitter and conveys this heat to solder pads on the circuit board. Heat generated by emitter must be removed to the environment to preclude failure or reduced light output.

Heat collected by the circuit board is transported to the environment through convective and conductive means. Convective heat loss is realized by heating the air confined within the lens, which circulates exchanging heat with the plastic or the glass lens. The lens dissipates heat to the environment primarily by convection. Conductive heat loss is realized by thermally conductive path through the length of the circuit board.

Thermally conductive paste is applied at the interface of the boards and the plate to maximize heat transfer. The circular plate is fabricated of a thermally conductive composition and may comprise an aluminum disk or a circular J-P Clad thermally conductive circuit board having electrical circuit components mounted thereto. Heat reaching the plate is transferred to the base and the ring by maintaining good thermal contact. The base and ring heat is dissipated to the environment through convective process and mounting arrangements.

In the preferred embodiment the lens will be sealed to the plate and any holes, fasteners, and electrical interfaces will also be sealed thereby providing an environmentally isolated portion. This sealed portion will be less susceptible to installation damage, be immune to corrosive atmospheres, and enable pre-focusing of the emitter/lens combination thereby providing superior product quality.

Emitters produce light in a diverging beam that is collected by the lens and formed into a beam pattern as required for an application. As an aircraft obstruction light, the output beam is a red color, covers 360 degrees azimuthally, and produces at least 32.5 candela over a 10-degree band centered between 4 and 20 degrees above a horizontal plane.

In another alternate embodiment, one or more additional emitters is positioned to produce light traveling in a vertical direction. This light emission will satisfy the aviation requirements for Canada (CSA.) These emitters may be affixed to the ends of board or one or more boards may be extended and bent at 90 degrees to accommodate mounting an emitter having a vertical light output disposition.

And yet another alternate embodiment employs more than one emitter on each circuit board. This embodiment includes that previously described.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illumination system for providing efficient and highly recognizable devices for producing light comprising in combination:
- a thin circular plate comprised of thermally conductive material having an upper surface and a lower surface;
- a plurality of rectilinear "L" shaped thermally conductive circuit boards each having an internal face, an external face, a pair of parallel side edges, a vertical portion and a horizontal portion and a bend there between, with the external face of the vertical portion having a means for attachment of at least one LED, and the horizontal portion having a means for attachment to the plate, the circuit boards being arranged in a configuration with adjacent parallel side edges separated from each other;
- at least one light emitting diode functioning as a light emitter being coupled to the vertical portion of the circuit board with means to maximize heat transfer;
- an optical lens of a generally cylindrical configuration formed as a dome having a closed top end and an open bottom end and comprised of a transparent material, the open bottom end being configured to lie adjacent to the upper surface of the plate;
- a mounting base of a generally cylindrical configuration with an open top part, a closed bottom part and a side face there around, the top part having a lip adapted to lie adjacent the lower surface of the plate with an aperture and flange extending from the mounting base;
- a plurality of rivets adapted to couple together the circuit boards and the plate and the base;
- a retainer ring adapted to couple together the lens and the plate and the mounting base; and
- an external electrical source operatively coupled to the system.

* * * * *